United States Patent [19]

Hochella et al.

[11] Patent Number: 5,356,603
[45] Date of Patent: * Oct. 18, 1994

[54] METHOD FOR THE PRODUCTION OF HYDROCYANIC ACID USING A CORRUGATED CATALYST

[75] Inventors: William A. Hochella, Coatesville; Steven A. Heffernen, Ambler, both of Pa.

[73] Assignee: Johnson Matthey Inc., Valley Forge, Pa.

[*] Notice: The portion of the term of this patent subsequent to Nov. 3, 2009 has been disclaimed.

[21] Appl. No.: 9,348

[22] Filed: Jan. 26, 1993

Related U.S. Application Data

[63] Continuation of Ser. No. 716,540, Jun. 17, 1991, abandoned.

[51] Int. Cl.$^5$ ............................................. C01C 3/14
[52] U.S. Cl. ..................................... 423/235; 423/372; 423/375; 423/376
[58] Field of Search .............. 423/372, 375, 376, 235; 502/326, 439, 509, 527

[56] References Cited

U.S. PATENT DOCUMENTS

| | | | |
|---|---|---|---|
| Re. 32,549 | 11/1987 | Bishop et al. | 428/594 |
| 1,144,457 | 6/1915 | Beindl | 423/372 |
| 1,927,963 | 9/1933 | Taylor | 23/234 |

(List continued on next page.)

FOREIGN PATENT DOCUMENTS

| | | |
|---|---|---|
| 0259966 | 3/1988 | European Pat. Off. . |
| 0364153 | 4/1989 | European Pat. Off. . |
| 2829035 | 1/1980 | Fed. Rep. of Germany . |
| 2855102 | 7/1980 | Fed. Rep. of Germany . |
| 2559787 | 8/1985 | France . |
| 521924 | 7/1976 | U.S.S.R. . |
| 2062486 | 11/1980 | United Kingdom . |

OTHER PUBLICATIONS

Fierro et al., "Morphological and Chemical Changes in Palladium etc.", Surface and Interface Analysis, vol. 14, pp. 529-536 (1989).
Anderson, D., "Catalytic Etching of Platinum Alloy Gauzes", Journal of Catalysis 113, pp. 475-489 (1988).
Hochella et al., (Allowed), Application Serial No. 07/716,548, filed Jun. 17, 1991.

Primary Examiner—Gary P. Straub
Assistant Examiner—Timothy C. Vanoy
Attorney, Agent, or Firm—Cushman, Darby & Cushman

[57] ABSTRACT

This invention is a method for producing hydrocyanic acid by using an element which comprises a foraminous structure fabricated from a material consisting essentially of a metal selected from the group consisting of platinum, rhodium, palladium and alloys of mixtures thereof characterized by (a) a novel configuration whereby the initial product of the formula: curve the flat ratio (C/F) multiplied by mesh size (N) and wire diameter ($d_w$), for said element is greater than at least about 0.08 and (b) where, for a given methane and ammonia throughput, the conversion efficiency is a function of the curve to flat ratio (C/F), wire diameter ($d_w$) and mesh size (N) combination and conversion efficiency is improved by increasing the mesh size (N) for a given wire diameter, increasing the wire diameter ($d_w$) for a given mesh size, and increasing the curve to flat ratio (C/F) to a ratio of above 1.0. Preferably the initial product of the formula is greater than 0.2 and the curve to flat ratio (C/F) is above 1.0, most preferably above about $\pi/2$. The preferred initial product of the formula is in the range of from 0.08 to about 10 and more preferred from about 0.2, most preferred 0.9, to about 10. The preferred element is woven gauze, knitted fabric, fibers and combinations thereof. The element can be in a series of said elements as a plurality of screens.

21 Claims, 1 Drawing Sheet

U.S. PATENT DOCUMENTS

| | | | |
|---|---|---|---|
| 3,434,826 | 3/1969 | Holzmann | 75/83 |
| 3,470,019 | 9/1969 | Steele | 117/227 |
| 3,545,939 | 12/1970 | Cox et al. | 502/439 |
| 3,660,024 | 5/1972 | Gillespie | 23/102 |
| 3,873,675 | 3/1975 | Roters | 423/403 |
| 3,881,877 | 5/1975 | Hunter | 23/288 R |
| 3,931,051 | 1/1976 | Dubler | 252/465 |
| 3,966,646 | 6/1976 | Noakes et al. | 252/477 R |
| 3,993,600 | 11/1976 | Hunter | 252/465 |
| 4,022,596 | 5/1977 | Pedersen | 55/528 |
| 4,351,887 | 9/1982 | Bishop | 428/594 |
| 4,363,753 | 12/1982 | Bozon et al. | 252/477 R |
| 4,375,426 | 3/1983 | Knapton et al. | 252/472 |
| 4,412,859 | 11/1983 | Hatfield et al. | 75/83 |
| 4,435,373 | 3/1984 | Knapton et al. | 423/403 |
| 4,438,082 | 3/1984 | Dettling et al. | 423/235 |
| 4,497,657 | 2/1985 | Hatfield et al. | 75/83 |
| 4,511,539 | 4/1985 | Stephenson | 422/311 |
| 4,526,614 | 7/1985 | Beshty et al. | 75/83 |
| 4,774,069 | 9/1988 | Handley | 423/403 |
| 4,863,893 | 9/1989 | Farrauto | 502/325 |
| 4,869,891 | 9/1989 | Handley | 423/403 |
| 4,929,398 | 5/1990 | Pedersen | 261/94 |
| 5,068,218 | 11/1991 | Nishizawa | 502/439 |
| 5,084,361 | 1/1992 | Toyoda et al. | 428/593 |
| 5,122,185 | 6/1992 | Hochella et al. | 75/410 |
| 5,262,145 | 11/1993 | Agrawal et al. | 423/372 |
| 5,266,293 | 11/1993 | Fairey et al. | 423/403 |
| 5,268,157 | 12/1993 | Blass et al. | 423/403 |
| 5,278,124 | 1/1994 | Hochella et al. | 502/326 |

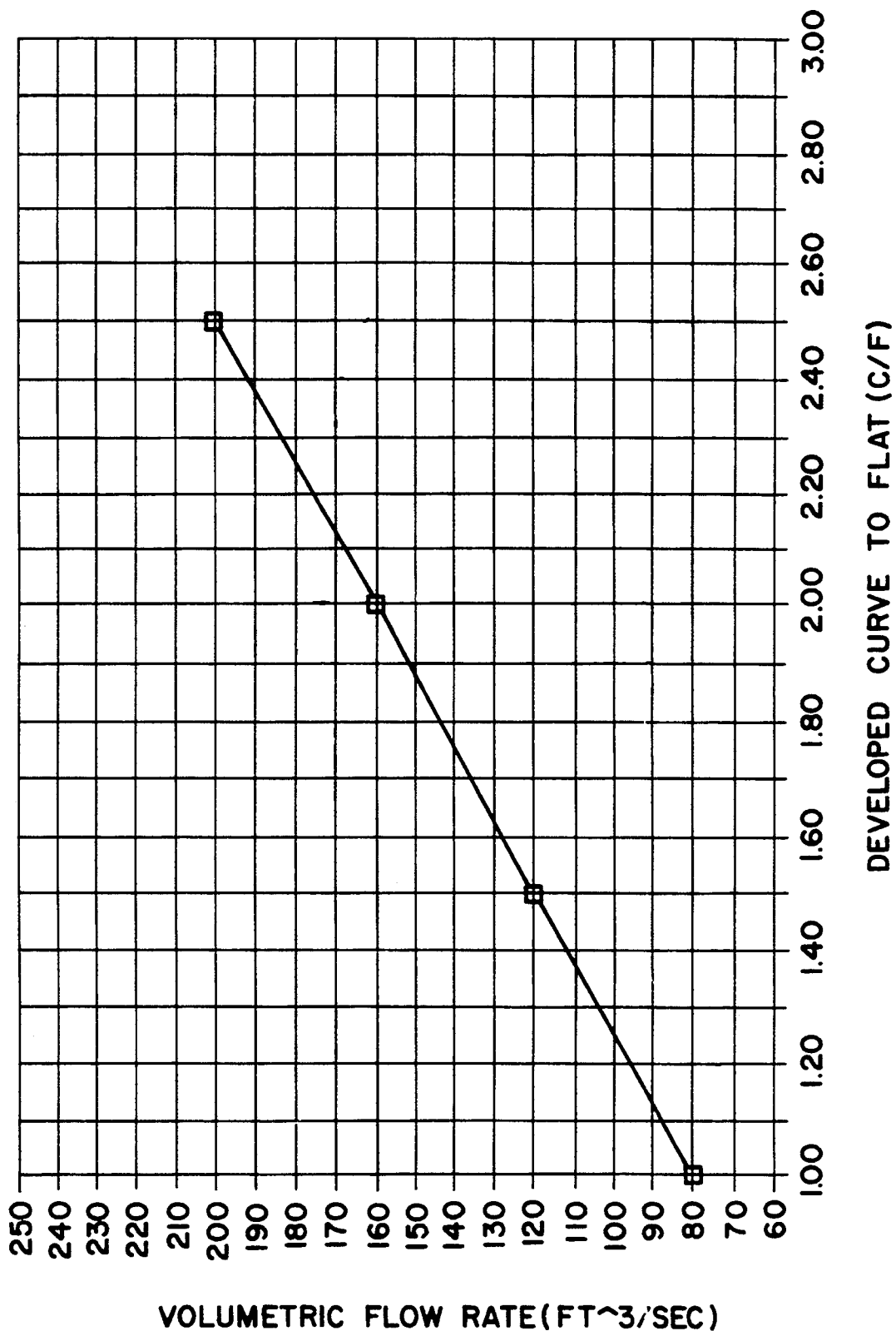

METHOD FOR THE PRODUCTION OF HYDROCYANIC ACID USING A CORRUGATED CATALYST

This is a continuation of Application Ser. No. 07/716,540, filed on Jun. 17, 1991, which was abandoned upon the filing hereof.

FIELD OF THE INVENTION

This invention relates to a method for production of hydrocyanic acid.

BACKGROUND OF THE INVENTION

A platinum-rhodium catalyst is utilized in the Andrussow process, for the production of hydrocyanic acid or hydrogen cyanide (HCN). In the Andrussow process, methane, ammonia, and oxygen are reacted by passing that gas mixture through a platinum alloy gauze pad. The reaction takes place at about 1000° C., and the heat liberated enables it to be self-sustaining. HCN formation proceeds according to one or other of the following reactions:

$$CH_4 + NH_3 + 3/2 O_2 \rightarrow HCN + 3H_2O$$

$$NH_3 + CH_4 \rightarrow HCN + 3H_2$$

The mixed gases are preheated to about 500° C., and the methane:ammonia mixture ratio is in the range 0.8 to 1.2:1.

Sufficient air is added to provide 25 to 40 percent of the theoretical requirement to oxidize the methane and ammonia. Reactors are similar to ammonia oxidation converters, although usually smaller in diameter. Since the gauze operates at about 1000° C., its radiant heat causes the converter walls to be hotter than in ammonia oxidation, and some ammonia is lost from the reaction by predecomposition. Some carbon monoxide and nitrogen are also formed by undesirable side reactions.

In hydrocyanic acid production, the catalyst pack consists of flat woven gauze. The conventional flat woven gauze is typically made with 80 mesh per inch and 0.003" wire. UK patent GB 2062486 B discloses the use of a system where the diameter of the wire is reduced from the front to the back of the flat woven gauze pack resulting in maximum conversion efficiency with minimum precious metal content and therefore also minimum metal loss from the catalyst. Other recent disclosures include U.S. Pat. No. 4,863,893 which claims improved catalyst "light-off" by the use of a high surface area per unit area of catalyst by the deposition of fine platinum particles onto the surface of the flat woven gauze. U.S. Pat. No. 4,863,893 is a variation of the technology of U.S. Pat. No. 3,470,019 which had a different method of deposition. Patent application EP O 364 153 A1 claims the use of a flat knitted fabric of precious metal for the oxidation of ammonia to nitric oxide. Recently, a flat woven gauze of 70 mesh, 0.003" wire diameter was introduced to the market place.

The catalyst pack of elements or sheets of gauze of precious metals and its use to catalyze ammonia is disclosed in U.S. Pat. No. 4,412,859, U.S. Pat. No. 4,497,657 and U.S. Pat. No. 4,526,614, all of which are hereby incorporated by reference, in toto, By curve to flat ratio is meant the ratio of that portion of an element of a catalyst (a sheet or gauze etc.) that is not in the base plane of the element to the portion that is in that plane. When curved, it is the ratio of curved section to the flat section.

SUMMARY OF THE INVENTION

This invention is a catalytic element for use in the catalytic production of hydrocyanic acid. The element comprises a foraminous structure fabricated from a material consisting essentially of a metal selected from the group consisting of platinum, rhodium, palladium and alloys of mixtures thereof characterized by (a) a novel configuration whereby the initial product of the formula: curve to flat ratio (C/F) multiplied by mesh size (N) and wire diameter ($d_w$), for the element is greater than at least about 0.08 and (b) where, for a given ammonia and methane throughput, the conversion efficiency is a function of the curve to flat ratio (C/F), wire diameter ($d_w$) and mesh size (N) combination and conversion efficiency is improved by increasing the mesh size (N) for a given wire diameter, increasing the wire diameter ($d_w$) for a given mesh size, and increasing the curve to flat ratio (C/F) to a ratio of above 1.0. Preferably the initial product of the formula is greater than 0.2 and the curve to flat ratio (C/F) is above 1.00, most preferably above $\pi/2$. The preferred initial product of the formula is in the range of from 0.08 to about 10 and more preferred from about 0.2 to about 10. The preferred element is woven gauze, knitted fabric, fibers and combinations thereof. Preferably the element is in a series of said elements as a plurality of screens.

Preferably the element consists of platinum or essentially of platinum alloyed with one or more metals selected from the group consisting of nickel, cobalt, palladium, ruthenium, iridium, gold, silver and copper. The preferred element contains platinum present in an amount of at least of about 70% by weight.

The preferred embodiment of this invention is an element wherein (C/F) is in the range of from above 1.0 to about 4, N is the range of from 40 to 120, $d_w$ is in the range of from about 0.001 to 0.018 and their respective values are such that the initial product of the formula is greater than at least 0.08, more preferably C/F is from above 1.00, most preferably above $\pi/2$ to about 4 and the product of the formula is greater than 0.2. In another embodiment, the initial product of the formula is in the range of from 0.08 to about 10, more preferably from about 0.2 to about 8.

In a preferred embodiment of this invention, the C/F ratio is achieved by means of forming the element into a pleat-like configuration. Preferably the ratio is achieved by means of parallel pleats. Alternately the ratio can be achieved by means of pleats in concentric patterns. Such patterns can be parallel lines, circles or polygons. The ratio can also be achieved by means of intersecting patterns resulting in the waffle-like pattern. The waffle-like pattern can be regular comprising straight lines or curved lines, or both. The waffle-like pattern could also be random with either straight or curved lines, or both. In another embodiment the C/F ratio can be achieved by means of shaped depressions on the surface of the element.

The method of this invention is a method for catalytic production of HCN which comprises using as catalyst a foraminate element fabricated from metal consisting essentially of a metal from the group consisting of platinum, rhodium, palladium and alloys of mixtures thereof characterized by (a) a novel configuration whereby the initial product of the formula: curve to flat ratio (C/F)

multiplied by mesh size (N) and wire diameter ($d_w$) for the element, is greater than at least about 0.08 and (b) where, for a given nitrogen throughput, the conversion efficiency is a function of the curve to flat ratio (C/F), wire diameter ($d_w$) and mesh size (N) combination and conversion efficiency is improved by increasing the mesh size (N) at a given wire diameter, increasing the wire diameter ($d_w$) at a given mesh size, and increasing the curve to flat ratio (C/F) to a ratio of above 1.0. Preferably the formula product is greater than about 0.2 and the C/F ratio is above 1.00, most preferably above about $\pi/2$. Preferably the product of the formula is in the range of from about 0.08 to about 10, more preferably to about 8, most preferably about 0.2 to about 8.

The method preferably uses elements of woven gauze, knitted fabric, fibers or combinations thereof. Preferably the elements are a plurality screens. The preferred method of this invention uses elements consisting essentially of platinum or platinum alloys of one or more metals selected from the group consisting of nickel, cobalt, palladium, rhodium, ruthenium, iridium, gold, silver and copper. Preferably platinum is present in the amount of at least about 70% by weight.

The preferred method of this invention is where (C/F) is in a range of from about greater than 1.0 to about 4, N is in the range of from about 40 to about 120, $d_w$ is in the range of from about 0.001 to about 0.018 and their respective values are such that the initial product of the formula is greater than about 0.08. Most preferably C/F is in a range of from above 1, most preferably above about $\pi/2$ to about 4 and the initial product of the formula is greater than at least of about 0.2, most preferably above about 0.9. Preferably the initial product of the formula is in the range of from about 0.08 to 10 and most preferably from about 0.2 to 8. Another embodiment of this invention when using multiple elements of this invention is modulating the initial product of the formula across the elements. The product can be modulated to change from higher at those elements initially contacted by ammonia/methane to lower where the ammonia/methane last contacts the elements. Or vice versa, from lower where the elements initially contacts the ammonia/methane to higher where the ammonia/methane last contacts the elements. The product of the formula can change by a recognizable pattern across the system, preferably a pattern described a variety of mathematical functions, most preferably the mathematical function selected from the groups consisting of linear, parabolic, hyperbolic, step, sinusoidal and combinations thereof. This modulation described above is useful both in the method of this invention and in the catalyst system using elements described by this invention.

This invention provides the following benefits.
1. By using a C/F ratio over 1, formerly flat screens are made three-dimensional, thereby increasing the surface area for greatly improved catalytic activity of the catalyst element. For example, using typical 80 mesh, 3 mil (0.003") screen, surface area per cross sectional area of the reactor can be increased threefold from 1.5 units at C/F equals 1, i.e. flat, to 4.5 units at C/F equals 3.
2. The higher surface area, per screen, made possible by increasing C/F ratio permits fewer elements or screens in the system and lower pressure difference across the total system used. This in turn permits higher throughput rates through the system, i.e., more tons per day production of HCN from the same equipment.
3. The production of hydrocyanic acid over the catalyst elements (screens) is also improved by the higher surface area of each element. More methane and ammonia, per ton of methane and ammonia throughput, is converted to hydrocyanic acid through the same equipment.
4. By another embodiment of this invention, namely, modulation of the factors determining surface area, either individually or by the formula, C/F (N) $d_w$, the catalyst surface area can by tailored to be maximum at the point in the system (screen pack) it is most effective and efficient.

The development of the high curve to flat ratio can be accomplished by the following methods:

Corrugating in a single direction perpendicular to the gas flow using a sinusoidal or pleat like pattern. This pattern can be used to develop curve to flat ratios in excess of 1:1, preferably $\pi/2:1$.

Corrugating a sinusoidal or pleat like pattern in a radial direction perpendicular to the gas flow can accomplish ratios of developed curve to flat ratios in excess of 1:1, preferably $\pi/2:1$. These patterns, if the patterns are assumed to be concentric circles, would appear similar to that developed by dropping a pebble in a puddle of water. This concept does not limit itself to the concept of concentric circles but extends to any concentric polygons or the like.

Corrugating a sinusoidal or pleat like pattern in two or more directions in the plane perpendicular to the gas flow can accomplish ratios of developed curve to flat ratios in excess of 1:1, preferably $\pi/2:1$. If two directions are chosen and they are perpendicular to one another the resulting pattern would be similar to that of a waffle.

This embodiment does not limit itself to the formation of sinusoidal or pleat like structures. Increased curve to flat ratios can be developed by pressing solid polygons into flat sheets to form series of shaped depressions on the formed surface.

This invention contemplates the use of varying meshes to compensate for the increased ammonia oxidation gauze weight per unit cross sectional area of reactor created by the developed curve to flat ratios in excess of 1:1, preferably $\pi/2:1$.

Also contemplated is the use of varying wire diameters to compensate for the increase in open area per unit cross sectional area of reactor created by the developed curve to flat ratios in excess of 1:1, preferably $\pi/2:1$. Some components at least of either the warp or the weft of the gauze may be made of thin wire and some of thick wire. Alternatively the entire warp or the entire weft may be made of thin wire and the entire weft and the entire warp made respectively made of thick wire.

This invention contemplates the use of varying meshes to compensate for the increase in open area per cross sectional area of reactor created by the developed curve to flat ratios in excess of 1:1, preferably $\pi/2:1$. Some components at least of either the warp or the weft of the gauze may be made of varying mesh count. Alternatively the entire warp or the entire weft may be made of varying mesh count.

The modulation mode of this invention also contemplates the use of varying wire diameters, meshes or both to compensate for the increased surface area of the woven gauze per cross sectional area of the reactor created by the developed curve to flat ratios in excess of 1:1, preferably $\pi/2:1$. Some components at least of either the warp or the weft of the gauze may be made of varying meshes or thin wire and some of thick wire. Alternatively the entire warp or the entire weft may be made of thin wire and the entire weft or the entire warp respectively made of thick wire.

BRIEF DESCRIPTION OF THE DRAWINGS

The figure is a curve showing the relation of flow rate to the curve to flat ratio of elements at a specific residence time (Corrugated Gauze for HCN Production-Residence Time $=6.8 \times 10^{-4}$).

Discussion

Pressure drop across the system would be significantly lower, especially above C/F of $\pi/2$ and residence times can be significantly increased at higher C/F ratios than 1. For example, residence time is doubled between C/F values of about 1.1 and about 1.6.

Conversion efficiency increases with residence time to an optimum at a residence time of about $7 \times 10^{-4}$ seconds with about 50 gauzes (elements or sheets).

Thus in a preferred embodiment of this invention, the optimum residence time would be found for the commercial plant in which the system will be used. Then the curves would be generated using the gas flow loading, number of sheets in the catalyst system and the desired mesh and wire diameter of each sheet desired. A series of such curves could be generated for various desired wire diameters and meshes. Then the computer generated residence time and pressure drop curves would make possible picking a C/F ratio for the actual commercial application.

DESCRIPTION OF PREFERRED EMBODIMENT

A computer model of the system of this invention is used to predict performance of various catalyst systems is various commercial plant situations.

The following are examples for use in the low pressure drop, high production capacity gauze for the production of Hydrogen Cyanide.

Example 1
(Prior Art)

A reactor for the production of hydrogen cyanide has a reactor diameter of 35 inches. The volumetric flow rate of ammonia, air and methane is 80 ft³/sec. It has been found that the maximum selectivity of the reactants to product is reached at a residence time of $6.8 \times 10^{-4}$ seconds. With a volumetric flow rate of 80 ft³/sec and a reactor diameter of 35 inches, 15 sheets of gauze are required to obtain a residence time of $6.8 \times 10^{4}$ seconds.

Example 2

The HCN producer wants to increase the volumetric flow rate of ammonia, air, and methane to 200 ft³/sec by increasing the curve to flat ratio of the gauze. FIG. 1 is a plot of volumetric flow rate vs. developed curve to flat ratio at a residence time of $6.8 \times 10^{-4}$ seconds and 15 sheets of gauze. To increase the production flow rate to 200 ft³/sec, the curve to flat ratio must be increased to 2.5.

The increased developed curve to flat ratios in excess of 1:1, independent of how they are formed, accomplish the following:

1) If it is assumed that the same precious metal alloy mesh and wire diameter system (80 mesh, 0.003": wire diameter) is used, the amount of available open area in the corrugated woven gauze system per unit area of reactor cross section increases; the amount of precious metal alloy available for catalysis increases per cross sectional area of reactor; the initial pressure drop and the rate of increase of pressure drop across corrugated woven gauze system decrease; the amount of hydrogen cyanide production per cross sectional area of reactor is increased; the increase of decrease or the above are functions of the developed curve to flat ration.

2) If it is assumed that a precious metal alloy gauze system of equal weight per cross sectional area of the reactor is used either the meshes per inch in the warp or the weft or both, wire diameter in the warp or the weft or both, of both must be changed.

EXAMPLE 3

Designated C/F ratio=2.6:1
Open Area=2.61×equivalent flat pack open area.
Precious Metal Alloy Weight=2.61×equivalent of flat pack precious metal alloy weight.

$$\frac{1}{2.61^2} = .1467 \text{ or } 14.67\% \text{ of equivalent flat woven gauze system}$$

(Assumption that flat pack has pressure drop of 1 unit)

While the invention has been described in connection with what is presently considered to be the most practical and preferred embodiments, the invention is not limited to the disclosed embodiments but, on the contrary, is intended to cover various modifications and equivalents included within the spirit and scope of the following claims.

We claim:

1. The method for catalytic production of hydrocyanic acid which comprises using as catalyst a corrugated element fabricated from metal consisting essentially of a metal selected from the group consisting of platinum, rhodium, palladium and alloys of mixtures thereof, said element being a plurality of sheets selected from the group consisting of a fibrous sheet, a knitted gauze, a woven gauze, and combinations thereof, said sheets being in contact with each other, said element being configured to have a curve to flat ratio C/F above 1 and said element further configured so that the initial product of the formula: curve to flat ratio (C/F) of the corrugations multiplied by mesh count per inch (N) and wire diameter in inches ($d_w$) for said element is greater than at least about 0.08 but less than about 10.

2. The method of claim 1 wherein said formula product is greater than about 0.9 and said C/F ratio is above $\pi/2$.

3. The method according to claim 1 wherein said product has a range of about 0.2 to about 8.

4. The method according to claim 1 wherein said element consists essentially of platinum alloyed with one or more metals selected from the group consisting of nickel, cobalt, palladium, rhodium, ruthenium, iridium, gold, silver and copper.

5. The method according to claim 4 wherein said platinum is present in an amount of at least about 70 by weight.

6. The method according to claim 1 wherein C/F is a range of from greater than 1.0 to about 4, N is in the range of from about 40 to about 120, $d_w$ is in the range of from about 0.001 to about 0.018 and their respective values are such that the initial product of said formula is greater than at least about 0.08.

7. The method according to claim 1 wherein C/F is in a range of from above 1.0 to about 4, N is in the range of from about 40 to about 120, $d_w$ is in the range of from about 0.001 to about 0.018 and their respective values are such that the initial product of said formula is greater than at least about 0.2.

8. The method according to claim 1 wherein the initial product of said formula is in the range of from about 0.2 to 8.

9. The method of claim 1 wherein a plurality of said elements are used.

10. The method of claim 9 wherein at least one element differs by said initial product from another element.

11. The method of claim 10 wherein said initial product of said formula is modulated across the elements, element to element.

12. The method of claim 11 wherein said product changes from a higher number at the elements initially contacted by ammonia/methane to a lower number where said ammonia/methane last contacts the elements.

13. The method of claim 11 wherein said product changes from a lower number at the elements initially contacted by ammonia/methane to a higher number where said ammonia/methane last contacts the elements.

14. The method of claim 11 wherein said product changes by a mathematical pattern across the plurality of elements.

15. The method of claim 14 wherein said mathematical function is selected from the group consisting of linear, parabolic, hyperbolic, step, sinusoidal and combinations thereof.

16. The method of claim 11 wherein said C/F ratio value is modulated element to element.

17. The method of claim 16 wherein said ratio changes from a higher number at the elements initially contacted by ammonia/methane to a lower number when said ammonia/methane last contacts the elements.

18. The method of claim 16 wherein said ratio changes from a lower number at the elements initially contacted by ammonia/methane to a higher number where said ammonia/methane last contacts the elements.

19. The method of claim 16 wherein said ratio changes by a mathematical pattern across the plurality of elements.

20. The method of claim 19 wherein said mathematical function is selected from the group consisting of linear, parabolic, hyperbolic, step, sinusoidal and combinations thereof.

21. The method for the catalytic production of hydrocyanic acid which comprises causing methane, ammonia and oxygen to flow across a catalytic screen element perpendicular to the base plane of said element and using a catalytic corrugated, woven wire screen element fabricated from metal consisting essentially of a metal selected from the group consisting of platinum, rhodium, palladium and alloys of mixtures thereof characterized by a configuration wherein the of the corrugations product of the formula: curve to flat ratio (C/F) multiplied by mesh count per inch (N) and wire diameter in inches ($d_w$) for said element is greater than at least about 0.08 but less than about 10 and wherein the curve to flat ratio (C/F) is a ratio of above 1.0.

* * * * *